United States Patent [19]

Sullivan

[11] Patent Number: 4,884,814
[45] Date of Patent: Dec. 5, 1989

[54] GOLF BALL

[75] Inventor: Michael J. Sullivan, Chicopee, Mass.

[73] Assignee: Spalding & Evenflo Companies, Inc., Tampa, Fla.

[21] Appl. No.: 144,200

[22] Filed: Jan. 15, 1988

[51] Int. Cl.$^4$ .................. A63B 37/12; C08K 3/14; C08K 3/30; C08L 33/02

[52] U.S. Cl. ............................ 273/235 R; 524/413; 524/423; 524/432; 524/908; 525/196; 525/221; 525/327.8; 525/330.2

[58] Field of Search ............... 524/413, 423, 432, 433, 524/521, 908; 273/235 R; 525/327.8, 330.2

[56] References Cited

U.S. PATENT DOCUMENTS

| | | | |
|---|---|---|---|
| 1,849,920 | 3/1932 | Gibbons et al. | |
| 1,991,367 | 2/1935 | Beck et al. | 166/23 |
| 2,323,775 | 7/1943 | Jones et al. | 260/787 |
| 2,338,863 | 1/1944 | Mathes | 260/787 |
| 2,530,789 | 11/1950 | Semegen | 260/3 |
| 2,644,850 | 7/1953 | Morgan | 260/763 |
| 2,835,642 | 5/1958 | Safford et al. | 260/41.5 |
| 2,975,151 | 3/1961 | Ropp | 260/29.7 |
| 3,256,227 | 6/1966 | Kraus | 260/23.7 |
| 3,264,272 | 8/1966 | Rees | 260/78.5 |
| 3,347,957 | 10/1967 | Adomaitis | 260/897 |
| 3,384,612 | 5/1968 | Brandt et al. | 260/41 |
| 3,388,186 | 6/1968 | Kray et al. | 260/357 |
| 3,404,134 | 10/1968 | Rees | 260/78.5 |
| 3,410,928 | 11/1968 | Braum | 260/897 |
| 3,418,270 | 12/1968 | Traub | 260/41 |
| 3,435,093 | 3/1969 | Cope | 260/857 |
| 3,437,718 | 4/1969 | Rees | 260/889 |
| 3,445,546 | 5/1969 | Pledger, Jr. | 260/897 |
| 3,454,676 | 7/1969 | Busse | 260/897 |
| 3,471,460 | 10/1969 | Rees | 260/88.1 |
| 3,472,916 | 10/1969 | Anspon | 260/857 |
| 3,489,642 | 1/1970 | Heuse | 161/205 |
| 3,639,527 | 2/1972 | Brinkmann et al. | 260/873 |
| 3,649,578 | 3/1972 | Bush et al. | 260/23 |
| 3,791,915 | 2/1974 | Goehring | 161/227 |
| 3,792,124 | 2/1974 | Davison et al. | 260/876 B |
| 3,802,912 | 4/1974 | Otocka | 117/118 |
| 3,819,768 | 6/1974 | Molitor | 260/897 B |
| 3,821,179 | 6/1974 | Powell | 260/88.1 |
| 3,895,035 | 7/1975 | Berg | 260/33.6 |
| 3,940,146 | 2/1976 | Little | 273/235 |
| 3,963,799 | 6/1976 | Starkweather, Jr. | 260/857 L |
| 3,968,065 | 7/1976 | Morris et al. | 260/23.5 |
| 3,969,434 | 7/1976 | Powell et al. | 260/897 B |
| 3,998,778 | 12/1976 | Berg et al. | 260/33.6 |
| 4,033,933 | 7/1977 | Shimizu et al. | 260/45.85 |
| 4,165,347 | 8/1979 | Bauer et al. | 525/69 |
| 4,173,669 | 11/1979 | Ashida et al. | 428/35 |
| 4,185,831 | 1/1980 | Tominaga | 273/235 |
| 4,187,358 | 2/1980 | Kyo | 525/132 |
| 4,217,430 | 8/1980 | Starkweather, Jr. | 525/183 |
| 4,219,628 | 8/1980 | Weemes | 525/166 |
| 4,235,980 | 11/1980 | Bateman | 525/215 |
| 4,254,013 | 3/1981 | Friedman | 260/42.47 |
| 4,264,075 | 4/1981 | Miller et al. | 273/235 |
| 4,274,637 | 6/1981 | Molitor | 273/235 |
| 4,305,851 | 12/1981 | Tominaga et al. | 260/5 |
| 4,323,247 | 4/1982 | Keches et al. | 273/235 |
| 4,324,872 | 4/1982 | Lakshmanan | 525/274 |
| 4,327,199 | 4/1982 | Coran et al. | 525/176 |
| 4,337,947 | 7/1982 | Saito et al. | 273/235 |
| 4,337,947 | 7/1982 | Ballard | 524/143 |
| 4,346,196 | 8/1982 | Hoh | 525/196 |
| 4,366,273 | 12/1982 | Aharoni | 523/400 |
| 4,373,066 | 2/1983 | Karim | 525/133 |
| 4,376,845 | 3/1983 | Metzger | 525/196 |
| 4,380,606 | 4/1983 | Coran | 525/196 |
| 4,387,188 | 6/1983 | Statz | 524/494 |
| 4,409,366 | 10/1983 | Schmelzer | 525/221 |
| 4,412,040 | 10/1983 | Albee, Jr. et al. | 525/143 |
| 4,420,580 | 12/1983 | Herman et al. | 524/424 |
| 4,468,499 | 8/1984 | Siegfried et al. | 525/301 |
| 4,473,683 | 9/1984 | Coran et al. | 525/78 |
| 4,483,537 | 11/1984 | Hanada et al. | 273/235 R |
| 4,526,375 | 7/1985 | Nakade | 273/235 R |
| 4,550,141 | 10/1985 | Hoh | 525/221 |
| 4,567,219 | 1/1986 | Tominaga | 524/413 |
| 4,591,611 | 5/1986 | Jenkins et al. | 524/64 |
| 4,603,172 | 7/1986 | Albee | 525/143 |
| 4,613,533 | 9/1986 | Loomis | 428/36 |
| 4,627,993 | 12/1986 | Loomis | 428/36 |
| 4,679,795 | 7/1987 | Melvin et al. | 524/908 |

OTHER PUBLICATIONS

Journal of Polymer Science, "Ionomeric Blends. I. Compatibilization of the Polystyrene-Poly(ethyl Acrylate) System via Ionic Interactions" (1983) pp. 224-230.
Macromolecules, vol. 17, "Miscibility Enhancement via Ion-Dipole Interactions. 1. Polystyrene Ionomer/Poly(alkylene oxide) Systems" (1984) pp. 1335-1350.
Journal of Polymer Science, Polymer Physics Edition, "Ionomeric Blends. II. Compatibility and Dynamic Mechanical Properties of Sulfonate cis-1,4-Polyisoprenes and Styrene/4-Vinylpyridine Copolymer Blends", (1983) pp. 595-603.
E. I. DuPont de Nemours & Company (Inc.) (Surlyn Grade Selector Guide) (1985).

(List continued on next page.)

Primary Examiner—Allan M. Lieberman
Attorney, Agent, or Firm—Donald R. Bahr

[57] ABSTRACT

The subject invention relates to golf ball technology, and more particularly, golf ball cover technology. The invention is concerned with a particular mixture of ionic resins as a golf ball cover composition.

Ionomers have been widely used as golf ball cover materials for the past 15 years. While these ionomers are very durable, they have a deficiency as a golf ball cover material in that they tend to be hard. This invention is concerned with a mixture of a hard ionomer with a soft ionomer in order to produce a golf ball cover composition wherein the cover is softer than the prior art ionomer covers.

A golf ball covered in accordance with this invention is durable and a skilled golfer can impart back spin to the ball in play.

26 Claims, No Drawings

OTHER PUBLICATIONS

Y. Nishiyama, et al., "Ionomer/Ionomer Thermoplastic IPN's Based on Poly(N-Butyl Acrylate) and Polystyrene".
Lundberg, R. D., et al., "A Comparison of Sulfonate and Carboxylate Ionomers" pp. 21–35.
Deanin, Rudolph D. et al. "Polyblends of an Ionomer with Nine Different Thermoplastics" pp. 813–817.
Deanin, Rudolph D. "Compatibility and Practical Properties of Polymer Blends" pp. 35–40.
Polym.-Plast. Technol. Eng. "Polymer Blends and Alloys for Molding Applications" (1984) pp. 27–54.
Journal of Polymer Science: Macromolecular Reviews. vol. 16 (1981) "The Structure and Properties of Ionomers" pp. 41–122.
Kinsey, Roy H., Applied Polymer Symposia (1969) "Ionomers, Chemistry and New Developments" pp. 77–94.
Koyayashi, Toshiaka, et al. "Properties of New Thermoplastic Elastomer, 'ELASTAR'" (1986).
Coran A. Y., "Thermoplastic Elastomers Prepared by Dynamic Vulcanization" (1986).
Paeglis, A. U., et al. "Thermoplastic Elastomer Compounds from Sulfonated EPDM Ionomers" (1986).
Plastics World "Ionomer resin slashes golf ball production time by 40%", date unknown.
Dupont Publication "SURLYN Low Modulus Ionomer Resins", date unknown.
World Patents Publication, "Golf Ball" Mar. 1984.
DuPont Publication, "Surlyn Typical Properties".
DuPont Publication, "Equilibrium Moisture Content of Surlyn 8940".

GOLF BALL

This invention relates to golf balls. More particularly, this invention relates to an improved golf ball cover useful in producing golf balls, particularly two-piece golf balls, exhibiting superior short iron and other playability characteristics.

BACKGROUND OF THE INVENTION

For many years balata and blends of balata with elastomeric or plastic materials were the principal materials used in the manufacture of top quality golf balls. Balata and balata-containing cover compositions posses the desirable property of ready adaption to molding and accordingly can be easily compression molded about a spherical wound core to produce a high quality golf ball.

The relative softness of the balata cover is advantageous in that an experienced golfer can apply a spin to balata-covered balls to control the ball in flight to produce a draw or a fade, or a backspin to cause the ball to "bite" or stop abruptly on contact with the green. Such playability properties are particularly important in short iron play and are exploited significantly by relatively skilled players.

However, balata covered golf balls are easily cut if mishit and golf balls produced with balata or balata-containing cover compositions have a relatively short life span.

Due to this negative property, balata and its synthetic substitutes, trans-polybutadiene and transpolyisoprene, have today been replaced essentially by new cover materials, primarily by a family of ionomers sold by E. I. duPont de Nemours & Company under the trademark SURLYN. These ionomers comprise copolymers of olefins, typically ethylene, with an alpha, beta ethylenically unsaturated carboxylic acid, such as methacrylic acid. Neutralization of a number of the acidic groups is effected with metal ions, such as zinc or sodium, resulting in a thermoplastic elastomer which has several advantages over balata when employed as the cover composition for golf balls.

In addition to cost-saving vis-a-vis balata, the hardness, resilience and other mechanical properties of these ionomers may be controlled in order to effect cut resistance, shear resistance, general durability and resilience. Such control can be exercised by selection of particular comonomers, molecular weight, degree of neutralization and the particular metal ions used.

The use of Surlyn as golf ball covers has been a major factor in the production of two-piece balls. These Surlyn balls for all practical purposes cannot be cut in play and they travel further when hit with a golf club as compared to the prior art balata covered balls. Regardless of these desirable properties, Surlyn covered golf balls have not proven desirable in short iron play, in that it is more difficult to impart spin to the Surly covered balls than to the balata covered counterpart. Further, frequently experienced golfers have noted that the Surlyn covered balls do not have a satisfactory "feel" or "click".

The golfing industry has therefore, for a number of years, attempted to develop a cover composition which possesses both the durability of the Surlyn formulations and the playability characteristics of the balata-based compositions.

In the mid-1980's, golf balls were introduced to the industry which were covered with a mixture of hard ionic resins and a thermoplastic polyurethane resin. The hard ionomers used in these blends had a hardness of about 94-95 on the Short C scale. While these balls have been generally satisfactory in providing the desirable qualities of playability and acceptable durability, these balls were disadvantageous in that they were short on distance when hit by an average golfer with an average swing velocity. Further, these prior art golf balls had a lower initial velocity when compared to prior art golf balls which were covered with a single or blend of hard ionomers. In the subject application, when a hard ionomer is referred to it is a Surlyn resin having a hardness of from about 94-96 on the Shore C scale.

Further, it has been noted that balls covered with the mixture of Surlyn and soft thermoplastic polyurethane tend to yellow and not to provide the bright white which can be obtained in traditional Surlyn covered balls. This deficiency results from the fact that the polyurethane resins tend to be yellow to off white in color.

Still further, the mixtures of Surlyns and polyurethanes are difficult to process and mold, such difficulties being inherent in all thermoplastic polyurethane resins. For example, it is difficult to obtain a homogeneous blend of Surlyns and polyurethanes in an extruder prior to injection molding the composition onto the preposition core.

It is felt that ionomers such as Surlyn ionomer are basically incompatible with polyurethane resins due to the backbone difference of each of these polymeric species. As a result of this incompatibility, delamination or separation in the manufacturing process may occur. Finally, such mixtures of Surlyns and polyurethane are expensive, due to the initial cost of the thermoplastic polyurethane and in compounding procedure requirements.

Attempts to modify the basic ionomer polyurethane compositions by such methods as adding additional hard ionomers to enhance toughness have been unsuccessful since the materials are basically incompatible at levels of greater than 15 to 20 percent ionomer. Further, blends of harder thermoplastic polyurethanes with hard ionomers have resulted in products lacking an adequate initial velocity.

It is, therefore, an object of the present invention to provide a golf ball which is cut resistant and provides the desirable playability features of balata-covered golf balls.

It is another object to provide a golf ball which is longer, i.e., does not have a distance shortcoming when struck with a golf club.

A further object of the present invention is to provide a golf ball which exhibits a bright white coloration and which does not yellow upon aging.

Still another object of this invention is to provide a golf ball cover composition which can be easily processed.

Lastly, it is an object of this invention to provide a golf ball cover composition which does not delaminate in either processing or on finished golf balls.

BRIEF DESCRIPTION OF THE INVENTION

In the prior art, two principal types of golf balls were known. The Surlyn covered golf balls which lack control and have a hardness of about 95 to 96 on the Shore C scale and the traditional Balata covered ball which had a hardness of about 75 on the Shore C scale.

Hard Surlyns suitable for use in golf ball cover compositions have been available for approximately 20 years. Initially, all Surlyns were ionomers which were very tough and hard. These properties of toughness and hardness made Surlyns commercially viable as a replacement for other polymeric materials in golf ball cover compositions. While these properties of toughness and hardness are advantageous, when it comes to the touchness and cut resistance of a golf ball, these properties are disadvantageous when it is desirable for a golfer to impart back spin to a golf ball as a result of the controlled striking of the ball with an iron club.

For over a decade the trade attempted to solve these problems of Surlyn covered golf balls by the blending of hard Surlyn with a soft Surlyn. Or in some instances, with a different type of polymeric material.

Until this invention, the blending of a hard Surlyn and a soft Surlyn as totally unsatisfactory in the production of a commercially viable golf ball, Basically, in the prior art, when a hard Surlyn was blended with a soft Surlyn to such a degree that the proper hardness or modulus was achieved, the durability of the golf ball deteriorated to a point where the resulting ball was not commercially viable.

In the prior art, endeavors were made to blend a hard Surlyn with other softer polymeric materials such as softer polyurethanes. While these endeavors were generally successful, the resulting golf balls had a deficiency in that they were generally short when compared to golf balls which were covered with a single or a blend of hard Surlyns. These blends of a hard Surlyn with a polyurethane were disadvantageous in that they exhibited light stability problems, they were hard to process and most significantly they were short on distance.

In accordance with the above description, it can be seen that while it was possible to achieve a given hardness by the blending of the prior art, hard and soft Surlyns, this blending did not necessarily result in a commercially viable golf ball.

In accordance with this invention, it has been found that when a hard Surlyn or a mixture of hard Surlyn resins are blended with a soft Surlyn which is a terpolymer of methacrylic acid and iso- or n-butylacrylate partially neutralized with a metal salt, a superior golf ball cover formulation is produced. The resulting cover composition of this invention is intermediate in softness between a balata covered golf ball and a hard Surlyn covered golf ball, to such a degree that an adequate back spin can be imparted to the ball by a skilled golfer. Further, the resulting golf ball of this invention exhibits a degree of cut resistance which is adequate for play and which is definitely superior to that of the above mentioned prior art balls which are covered with a blend of a hard Surlyn and a polyurethane resin.

Lastly but most importantly, the golf ball of this invention in addition to having the above described properties, exhibits outstanding distance properties which is exhibited by its coefficient of restitution and/or initial velocity when tested in accordance with the rules and regulations of the United States Golf Association.

In order to achieve these desired physical properties, it is imperative that the hard ionomer and soft ionomer be blended in particular proportions which are described hereinbelow.

DESCRIPTION OF THE PREFERRED EMBODIMENT

The desirable properties and the resulting golf balls as described herein above are achieved in accordance with this invention by the blending of a high modulus (hard) ionomer with a low modulus (soft) ionomer to produce a base ionomer mixture.

In this invention, a high modulus ionomer is an ionomer having a flexural modulus of from about 30,000 to 55,000 P.S.I. as measured in accordance with A.S.T.M. method D-790. All moduli measured and referred to in accordance with this invention are flexural moduli.

The physical properties of the ionomers which are useful in this invention may be further defined by the hardness of said ionomers. The high modulus ionomers as defined above have a hardness of from about 60 to 66 on the Shore D scale as measured in accordance with ASTM method D-2240.

The modulus of the ionomers which are useful in this invention is closely related to the hardness of said ionomers. Generally, the higher the modulus, the harder the ionomer although one skilled in the art recognizes that there may be exceptions to this rule.

The hard Surlyn resins are used in this invention are ionic copolymers which are the sodium or zinc salts of the reaction product of an olefin having from 2 to 8 carbon atoms and an unsaturated monocarboxylic acid having from 3 to 8 carbon atoms. The carboxylic acid groups of the copolymer may be totally or partially neutralized.

These hard ionomers are sold under the trademark SURLYN. In the high modulus ionomers which are useful in this invention, the acid groups may be 15–75 percent cation neutralized with either sodium or zinc cations.

A low modulus ionomer as is useful in the blends of this invention has a modulus of from about 3,000 to about 7,000 P.S.I. and a hardness of from about 25 to about 40 as measured on the Shore D scale. Both the modulus and hardness were measured in accordance with the A.S.T.M. tests as referred to above. The low modulus ionomers for use in accordance with the preferred embodiment are terpolymers of ethylene, methacrylic acid and n- or iso-butylacrylate. In these low modulus ionomers, the acid groups may be 5–95 percent cation neutralized with sodium or zinc cations.

It is understood by one skilled in the art that the soft ionomer may be a sodium or zinc salt of a terpolymer of an olefin having from 2 to 8 carbon atoms, an unsaturated monocarboxylic acid having from 3 to 8 carbon atoms and an unsaturated monomer of the acrylate ester class having from 2 to 22 carbon atoms.

As a starting point in preparation of the cover formulations in accordance with this invention, a based ionomer mixture is formed from low and high modulus ionomers as are described above. This base ionomer mixture can comprise from about 25 to about 75 parts of a low modulus ionomer and from about 25 to about 75 parts of a high modulus ionomer. A more preferred range is from about 35 to about 65 parts of a low modulus ionomer and from about 65 to about 35 parts of a high modulus ionomer. A most preferred range for the base ionomer mixture is from about 38 to about 62 parts of a low modulus ionomer and from about 62 to about 38 parts of a high modulus ionomer.

Two preferred embodiments for use in accordance with this invention are as follows: About 61.9 parts of a low modulus ionomer and 38.1 parts of a high modulus ionomer, and still another preferred embodiment uses about 39.6 parts of a low modulus ionomer and 60.4 parts of a high modulus ionomer.

The above described base ionomer mixture can be used to produce a superior golf ball cover and hence superior golf balls. Tradition dictates that golf balls be either white or colored. In order to achieve this end, a pigment must be added to the base ionomer mixture. Most commonly white pigments are utilized to produce the traditional white golf ball. Suitable white pigments for use in this invention are titanium dioxide, zinc oxide, barium sulfate and zinc sulfate. It is understood by one skilled in the art that covers other than white can be made by adding colored dyes or pigments to the subject base ionomer mixture.

The amount of pigment used in conjunction with the polymeric cover composition naturally depends on the particular base ionomer mixture utilized and the particular pigment utilized. The concentration of the pigment in the polymeric cover composition can be from about 1% to about 10% as based on the weight of the base ionomer mixture. A more preferred range is from about 1% to about 5% as based on the weight of the base ionomer mixture. The most preferred range is from about 1% to about 3% as based on the weight of the base ionomer mixture.

The most preferred pigment for use in accordance with this invention is titanium dioxide. When this combination of components is utilized, it is preferred that the concentration of titanium dioxide in the cover composition be from about 1% to about 10% as based on the weight of the base ionomer mixture utilized. A more preferred range for the concentration of titanium dioxide is from about 1% to about 5% as based on the base ionomer mixture utilized. A more preferred concentration for the titanium dioxide is about 2% as based on the weight of the base ionomer mixture utilized.

It is within the purview of this invention to add to the cover compositions of this invention compatible materials which do not affect the basis novel characteristics of the composition of this invention. Among such materials are antioxidants, antistatic agents, stabilizers and processing aids.

Functional cover compositions for producing white golf balls in accordance with this invention are as follows:
Base Ionomer Mixture from about 90% to about 99%
White Pigment from about 10% to about 1%
Blue Pigment - trace A more preferred cover composition for use in accordance with this invention is as follows:
Base Ionomer Mixture from about 95% to about 99%
0Titanium Dioxide from about 5% to about 1%
0Blue Pigment - trace A preferred cover composition for use in accordance with this invention is as follows:
Base Ionomer Mixture* from about 95% to about 97%
Titanium Dioxide from about 4% to about 2%
Ultramarine Blue - trace
Nucrel** 925 from about 0% to about 1.0%

*The base ionomer mixture used in this preferred composition comprises 43.1 parts of a low modulus ionomer sold as Surlyn AD-8269, 18.8 parts of a low modulus ionomer sold as Surlyn AD-8265, 25.1 parts of a high modulus Surlyn sold as Surlyn 9910, 5.6 parts of high modulus Surlyn sold as Surlyn 8940 and 7.4 parts of a high modulus Surlyn sold as Surlyn 8528.
**Nucrel is used as a processing agent, it is thought to be a copolymer of ethylene and methacrylic acid.

Still another preferred cover composition for use in accordance with this invention is as follows:
Base Ionomer Mixture*** from about 96% to about 98%
Titanium Dixiode from about 2% to about 4%
Ultramarine Blue - trace

***The base ionomer mixture used in this instance comprises 27.6 parts of a low modulus ionomer sold as Surlyn AD-8269, 12.0 parts of a low modulus ionomer sold as Surlyn AD-8265, 42.2 parts of a high modulus Surlyn sold as Surlyn 9910, 10.8 parts of a high modulus Surlyn sold as Surlyn 8940 and 7.4 parts of a high modulus Surlyn sold as Surlyn 9650.

When a white pigment is utilized, the resulting covers are pure white in that the polymeric components which make up the cover stock do not detract from the whiteness of the pigment. In their pure state the high and low modulus polymeric components are clear. This is to be contrasted with the off white or yellow color of the prior art compositions which incorporate polyurethane components. Because the resulting cover composition of this invention is pure white, the technology of U.S. Pat. No. 4,679,795 can be readily adapted to this invention. That is the surface of golf balls made in accordance with this invention can be optically brightened as per the teaching of this patent.

This invention can likewise be used in conjunction with cellular polymeric golf ball covers as are described in U.S. Pat. No. 4,274,637 issued June 23, 1981.

One skilled in the art is aware of the fact that there are various hues of the color white; for example, there are blue whites, yellow whites, etc. In accordance with the preferred embodiment of this invention, trace amounts of a blue pigment are added to the golf ball cover composition in order to give said cover composition materials a blue white appearance. Naturally, it is understood if other hues of the color white are desired, different pigments can be added to the cover composition material. The amount of pigment used must be adjusted by one skilled in the art in order to achieve the desired color hue.

In the subject specification and claims, the term "center" is utilized to define the central part of the finished golf ball. As used in this specification and claims the term "center" refers to both solid centers as are used on two-piece golf balls, and to wound centers which are commonly used in balls which are referred to in the trade as three-piece golf balls.

The following examples serve to illustrate the present invention, such examples given for the purpose of illustration and not for purposes of limiting the present invention. In the examples, all parts percent are given by weight unless otherwise specified.

EXAMPLES

Finished golf balls were prepared for the below listed examples by positioning performed, cross-linked polybutadiene cores in an injection molding cavity. The cores in question were centrally positioned in the cavities by the use of retractable pins. The cover was then injection molded around the core.

In all examples, the cover composition formulas are on a parts by weight basis. The Surlyn and Nucrel resins are used in these examples are a product of the E. I. DuPont de Nemours & Co., Inc., Wilmington, Del.

TABLE I

|  | Melt Index g/10 min | Cation | Tensile St. psi | % Elong | Flex Mod psi | Hardness Shore D |
| --- | --- | --- | --- | --- | --- | --- |
| Surlyn 8269 | 0.9–1.2 | Sodium | 3100 | 770 | 2800 | 25 |
| Surlyn 8265 | 0.9–1.2 | Sodium | 4200 | 660 | 7100 | 39 |
| Surlyn 9910 | 0.7 | Zinc | 3600 | 290 | 48,000 | 64 |
| Surlyn 8528 | 1.3 | Na | 4200 | 450 | 32,000 | 60 |
| Surlyn 8940 | 2.8 | Na | 4800 | 470 | 51,000 | 65 |
| Surlyn 9650 | 5.0 | Zn | 3200 | 410 | 32,000 | 63 |
| Nucrel 925 | 25.0 | None | 3600 | 520 | 10,800 | 50 |

The test data for the golf balls of the below listed examples is expressed in Tables 2 thru 5 herein below.

Riehle compression is a measurement of the deformation of a golf ball under a fixed static load of 225 pounds.

Coefficient of restitution was measured by firing the resulting golf ball in an air cannon at a velocity of 125 feet per second against a steel plate which is positioned 12 feet from the muzzle of the cannon. The rebound velocity was then measured. The rebound velocity was divided by the forward velocity to give the coefficient of restitution.

Shore hardness was measured in accordance with ASTM Test 2240.

Cut resistance was measured in accordance with the following procedure: A golf ball is fired at 135 feet per second against the leading edge of a pitching wedge, wherein the leading edge radius is 1/32 inch, the loft angle is 51 degrees, the sole radius is 2.5 inches, and the bounce angle is 7 degrees.

The cut resistance of the balls tested herein was evaluated on a scale of 1–5. 1 represents a cut that extends completely through the cover to the core; a 2 represents a cut that does not extend completely through the cover but that does break the surface; a 3 does not break the surface of the cover but does leave a permanent dent; a 4 leaves only a slight crease which is permanent but not as severe as 3; and a 5 represents virtually no visible indentation or damage of any sort.

The total distance was measured by striking the golf ball with a mechanical device which swings a driver at a head speed of 160 feet per second.

The spin rate of the golf ball was measured by striking the resulting golf balls with a #5 iron in the manner as described above wherein the head speed is 128 feet per second at a launch angle of 10 t0 12 degrees and an initial velocity of about 168 feet per second.

The spin rate was measured by observing the rotation of the ball in flight using stop action Strobe photography.

The trajectory of the golf balls during flight was measured in accordance with United States Golf Association Test: Symmetry (1.5).

Initial velocity is the velocity of a golf ball when struck at a hammer speed of 143.8 feet per second in accordance with a test as prescribed by the United States Golf Association.

The Ultramarine Blue used in these examples is a pigment dye as sold by Whitaker, Clark and Daniels, of South Plainsfield, N.J.

EXAMPLE 1

Using the procedures described above, at least 72 golf balls were prepared wherein the cover had the following composition:

| | |
| --- | --- |
| Surlyn 8940 | 5.6 |
| Surlyn 8528 | 7.4 |
| Surlyn 9910 | 25.1 |
| Surlyn AD-8269 | 43.1 pph |
| Surlyn AD-8265 | 18.8 |
| Titanium dioxide | 2.3 |
| Ultramarine Blue | 0.02 |
| Uvitex OB | 0.10 |
| Nucrel 925 | 1.0 |

EXAMPLE 2

Using the procedures described above, at least 72 golf balls were prepared wherein the cover had the following composition:

| | |
| --- | --- |
| Surlyn 8940 | 10.8 |
| Surlyn 9650 | 7.4 |
| Surlyn 9910 | 42.2 |
| Surlyn AD-8269 | 27.6 |
| Surlyn AD-8265 | 12.0 |
| Titanium dioxide | 2.3 |
| Ultramarine Blue | 0.02 |
| Uvitex OB | 0.10 |

EXAMPLE 3

Using the procedures described above, at least 72 golf balls were prepared wherein the cover had the following composition:

| | |
| --- | --- |
| Surlyn 8528 | 7.5 |
| Surlyn 8940 | 5.6 |
| Surlyn 9910 | 25.2 |
| Surlyn AD-8269 | 43.0 |
| Surlyn AD-8265 | 18.7 |
| Titanium dioxide | 2.3 |
| Ultramarine Blue | 0.02 |
| Uvitex OB | 0.10 |

EXAMPLE 4

Using the procedures described above, at least 72 golf balls were prepared wherein the cover had the following composition:

| | |
| --- | --- |
| Surlyn 8528 | 7.4 |
| Surlyn 8940 | 20.5 |
| Surlyn 9910 | 24.9 |
| Surlyn AD-8269 | 32.9 |
| Surlyn AD-8265 | 14.3 |
| Titanium dioxide | 2.3 |
| Ultramarine Blue | 0.02 |
| Uvitex OB | 0.10 |

EXAMPLE 5

Using the procedures described above, at least 72 golf balls were prepared wherein the cover had the following composition:

| | |
|---|---|
| Surlyn 8528 | 7.4 |
| Surlyn 8940 | 35.9 |
| Surlyn 9910 | 24.9 |
| Surlyn AD-8269 | 22.2 |
| Surlyn AD-8265 | 9.6 |
| Titanium dioxide | 2.3 |
| Ultramarine Blue | 0.02 |
| Uvitex OB | 0.10 |

EXAMPLE 6

Using the procedures described above, at least 72 golf balls were prepared wherein the cover had the following composition:

| | |
|---|---|
| Surlyn 8528 | 7.4 |
| Surlyn 8940 | 51.2 |
| Surlyn 9910 | 24.9 |
| Surlyn AD-8269 | 11.5 |
| Surlyn AD-8265 | 5.0 |
| Titanium dioxide | 2.3 |
| Ultramarine Blue | 0.02 |
| Uvitex OB | 0.10 |

EXAMPLE 7

Using the procedures described above, at least 72 golf balls were prepared wherein the cover had the following composition:

| | |
|---|---|
| Surlyn 8528 | 7.4 |
| Surlyn 8940 | 70.2 |
| Surlyn 9910 | 22.4 |
| Surlyn AD-8269 | |
| Surlyn AD-8265 | |
| Titanium dioxide | 2.3 |
| Ultramarine Blue | 0.02 |
| Uvitex OB | 0.10 |

EXAMPLE 8

Using the procedures described above, at least 72 golf balls were prepared wherein the cover had the following composition:

| | |
|---|---|
| Surlyn 8528 | 7.4 |
| Surlyn 8940 | |
| Surlyn 9910 | 24.9 |
| Surlyn AD-8269 | 47.1 |
| Surlyn AD-8265 | 20.5 |
| Titanium dioxide | 2.3 |
| Ultramarine Blue | 0.02 |
| Uvitex OB | 0.10 |

EXAMPLE 9

Using the procedures described above, at least 72 golf balls were prepared wherein the cover had the following composition:

| | |
|---|---|
| Surlyn 8528 | 7.4 |
| Surlyn 8940 | |
| Surlyn 9910 | 16.4 |
| Surlyn AD-8269 | 53.0 |
| Surlyn AD-8265 | 23.2 |
| Titanium dioxide | 2.3 |
| Ultramarine Blue | 0.02 |
| Uvitex OB | 0.10 |

EXAMPLE 10

Using the procedures described above, at least 72 golf balls were prepared wherein the cover had the following composition:

| | |
|---|---|
| Surlyn 8528 | 7.4 |
| Surlyn 8940 | |
| Surlyn 9910 | 8.2 |
| Surlyn AD-8269 | 58.8 |
| Surlyn AD-8265 | 25.6 |
| Titanium dioxide | 2.3 |
| Ultramarine Blue | 0.02 |
| Uvitex OB | 0.10 |

EXAMPLE 11

Using the procedures described above, at least 72 golf balls were prepared wherein the cover had the following composition:

| | |
|---|---|
| Surlyn 8528 | 7.4 |
| Surlyn 8940 | |
| Surlyn 9910 | |
| Surlyn AD-8269 | 64.5 |
| Surlyn AD-8265 | 28.1 |
| Titanium dioxide | 2.3 |
| Ultramarine Blue | 0.02 |
| Uvitex OB | 0.10 |

EXAMPLE 12

Using the procedures described above, at least 72 golf balls were prepared wherein the cover had the following composition:

| | |
|---|---|
| Surlyn 8940 | |
| Surlyn 9910 | 17.5 |
| Surlyn AD-8269 | 57.5 |
| Surlyn AD-8265 | 25.0 |
| Titanium dioxide | 2.3 |
| Ultramarine Blue | 0.02 |
| Uvitex OB | 0.10 |

EXAMPLE 13

Using the procedures described above, at least 72 golf balls were prepared wherein the cover had the following composition:

| | |
|---|---|
| Surlyn 8940 | |
| Surlyn 9910 | 42.5 |
| Surlyn AD-8269 | 57.5 |
| Surlyn AD-8265 | |
| Titanium dioxide | 2.3 |
| Ultramarine Blue | 0.02 |
| Uvitex OB | 0.10 |

EXAMPLE 14

Using the procedures described above, at least 72 golf balls were prepared wherein the cover had the following composition:

| | |
|---|---|
| Surlyn 9910 | 40.0 |
| Surlyn AD-8269 | 60.0 |
| Surlyn | |
| Titanium dioxide | 2.3 |
| Ultramarine Blue | 0.02 |
| Uvitex OB | 0.10 |

EXAMPLE 15

Using the procedures described above, at least 72 golf balls were prepared wherein the cover had the following composition:

| | |
|---|---|
| Surlyn 9910 | 30.0 |
| Surlyn AD-8269 | 70.0 |
| Surlyn | |
| Titanium dioxide | 2.3 |
| Ultramarine Blue | 0.02 |
| Uvitex OB | 0.10 |

EXAMPLE 16

Using the procedures described above, at least 72 golf balls were prepared wherein the cover had the following composition:

| | |
|---|---|
| Surlyn 9910 | 20.0 |
| Surlyn AD-8269 | 80.0 |
| Surlyn | |
| Titanium dioxide | 2.3 |
| Ultramarine Blue | 0.02 |
| Uvitex OB | 0.10 |

EXAMPLE 17

Using the procedures described above, at least 72 golf balls were prepared wherein the cover had the following composition:

| | |
|---|---|
| Surlyn 9910 | 14.0 |
| Surlyn AD-8269 | 57.5 |
| Surlyn 8940 | 28.5 |
| Titanium dioxide | 2.3 |
| Ultramarine Blue | 0.02 |
| Uvitex OB | 0.10 |

EXAMPLE 18

Using the procedures described above, at least 72 golf balls were prepared wherein the cover had the following composition:

| | |
|---|---|
| Surlyn 9910 | 13.2 |
| Surlyn AD-8265 | 60.0 |
| Surlyn 8940 | 26.8 |
| Titanium dioxide | 2.3 |
| Ultramarine Blue | 0.02 |
| Uvitex OB | 0.10 |

EXAMPLE 19

Using the procedures described above, at least 72 golf balls were prepared wherein the cover had the following composition:

| | |
|---|---|
| Surlyn 9910 | 9.9 |
| Surlyn AD-8269 | 70.0 |
| Surlyn 8940 | 20.1 |
| Titanium dioxide | 2.3 |
| Ultramarine Blue | 0.02 |
| Uvitex OB | 0.10 |

EXAMPLE 20

Using the procedures described above, at least 72 golf balls were prepared wherein the cover had the following composition:

| | |
|---|---|
| Surlyn 9910 | 6.6 |
| Surlyn AD-8269 | 80.0 |
| Surlyn 8940 | 13.4 |
| Titanium dioxide | 2.3 |
| Ultramarine Blue | 0.02 |
| Uvitex OB | 0.10 |

EXAMPLE 21

Using the procedures described above, at least 72 golf balls were prepared wherein the cover had the following composition:

| | |
|---|---|
| Surlyn 8940 | 70.2 |
| Surlyn 9910 | 22.40 |
| Surlyn 9650 | 7.4 |
| Titanium dioxide | 2.3 |
| Ultramarine Blue | 0.02 |
| Uvitex OB | 0.10 |

EXAMPLE 22

Using the procedures described above, at least 72 golf balls were prepared wherein the cover had the following composition:

| | |
|---|---|
| Surlyn 8660 | 46.3 |
| Surlyn 9970 | 46.3 |
| Surlyn 9650 | 7.4 |
| Titanium dioxide | 2.3 |
| Ultramarine Blue | 0.02 |
| Uvitex OB | 0.10 |

EXAMPLE 23

Using the procedures described above, at least 72 golf balls were prepared wherein the cover had the following composition:

| | |
|---|---|
| Surlyn 8020 | 46.3 |
| Surlyn 9520 | 46.3 |
| Surlyn 9650 | 7.4 |
| Titanium dioxide | 2.3 |
| Ultramarine Blue | 0.02 |
| Uvitex OB | 0.10 |

EXAMPLE 24

Using the procedures described above, at least 72 golf balls were prepared wherein the cover had the following composition:

| | |
|---|---|
| Surlyn 9910 | 78.7 |
| Surlyn 9650 | 7.4 |
| Surlyn | |
| Titanium dioxide | 2.3 |
| Ultramarine Blue | 0.02 |
| Uvitex OB | 0.10 |
| Nucrel 925 | 13.9 |

EXAMPLE 25

Using the procedures described above, at least 72 golf balls were prepared wherein the cover had the following composition:

| | |
|---|---|
| Surlyn 9910 | 74.1 |
| Surlyn 8020 | 9.3 |
| Surlyn 9650 | 7.4 |
| Titanium dioxide | 2.3 |
| Ultramarine Blue | 0.02 |
| Uvitex OB | 0.10 |
| Nucrel 925 | 9.2 |

EXAMPLE 26

Using the procedures described above, at least 72 golf balls were prepared wherein the cover had the following composition:

| | |
|---|---|
| Surlyn 9970 | 20.0 |
| Texin 480AR | 80.0 |
| Titanium dioxide | 5.0 |
| Ultramarine Blue | 0.02 |
| Uvitex OB | 0.10 |

EXAMPLE 27

Using the procecures described above, at least 72 golf balls were prepared wherein the cover had the following composition:

| | |
|---|---|
| Texin 913 | 100.0 |
| Titanium dioxide | 5.0 |
| Ultramarine Blue | 0.02 |
| Uvitex OB | 0.10 |

EXAMPLE 28

Using the procedures described above, at least 72 golf balls were prepared wherein the cover had the following composition:

| | |
|---|---|
| Texin 915 | 100.0 |
| Titanium dioxide | 5.0 |
| Ultramarine Blue | 0.02 |
| Uvitex OB | 0.10 |

EXAMPLE 29

Using the procedures described above, at least 72 golf balls were prepared wherein the cover had the following composition:

| | |
|---|---|
| Texin 345D | 100.0 |
| Titanium dioxide | 5.0 |
| Ultramarine Blue | 0.02 |
| Uvitex OB | 0.10 |

EXAMPLE 30

Using the procedures described above, at least 72 golf balls were prepared wherein the cover had the following composition:

| | |
|---|---|
| Texin 355 | 100.0 |
| Titanium dioxide | 5.0 |
| Ultramarine Blue | 0.02 |
| Uvitex OB | 0.10 |

EXAMPLE 31

Using the procedures described above, at least 72 golf balls were prepared wherein the cover had the following composition:

| | |
|---|---|
| Surlyn 9970 | 20.0 |
| Texin 480AR | 80.0 |
| Titanium dioxide | 5.0 |
| Ultramarine Blue | 0.02 |
| Uvitex OB | 0.10 |

EXAMPLE 32

Using the procedures described above, at least 72 golf balls were prepared wherein the cover had the following composition:

| | |
|---|---|
| Texin 480AR | 65.0 |
| Texin E915 | 35.0 |
| Titanium dioxide | 5.0 |
| Ultramarine Blue | 0.02 |
| Uvitex OB | 0.10 |

EXAMPLE 33

Using the procedures described above, at least 72 golf balls were prepared wherein the cover had the following composition:

| | |
|---|---|
| Pellethane 2355 | 80A |
| Pellethane 2355 | 90A |
| Titanium dioxide | 5.0 |
| Ultramarine Blue | 0.02 |
| Uvitex OB | 0.10 |

TABLE 2

| EXAMPLE NO. | 1 | 2 | 3 | 4 | 5 | 6 | 7 | 8 | 9 | 10 | 11 |
|---|---|---|---|---|---|---|---|---|---|---|---|
| Weight | 45.0 | 45.0 | 45.4 | 45.4 | 45.4 | 45.4 | 45.4 | 45.4 | 45.4 | 45.4 | 45.4 |
| Compression | 56 | 56 | 55 | 55 | 54 | 52 | 51 | 51 | 57 | 57 | 59 |

TABLE 2-continued

| EXAMPLE NO. | 1 | 2 | 3 | 4 | 5 | 6 | 7 | 8 | 9 | 10 | 11 |
|---|---|---|---|---|---|---|---|---|---|---|---|
| C.O.R. | .804 | .807 | .797 | .798 | .805 | .806 | .813 | .796 | .794 | .793 | .789 |
| Shore C Hardness | 87 | 90 | 86 | 87 | 90 | 92 | 94 | 85 | 81 | 77 | 75 |
| Cut Resistance | 4–5 | 4–5 | 4–5 | 4–5 | 5 | 4–5 | 4–5 | 4 | 3–4 | 3 | 3 |
| Driver Testing: | | | | | | | | | | | |
| Carry | 258.0 | 248.7 | | | | | | | | | |
| Total | 299.0 | 266.2 | | | | | | | | | |
| Timed Flight | | 5.97 | | | | | | | | | |
| Trajectory | 13.8 | 14.1 | | | | | | | | | |
| 5-Iron: | | | | | | | | | | | |
| Launch Angle | | 7.8 | | | | | | | | | |
| Clubhead Speed | | 236.6 | | | | | | | | | |
| Spin Rate | | 2744 | | | | | | | | | |
| Pitching Wedge: | | | | | | | | | | | |
| Launch Angle | 29.8 | | | | | | | | | | |
| Clubhead Speed | 108.8 | | | | | | | | | | |
| Spin Rate | 9709 | | | | | | | | | | |

TABLE 3

| EXAMPLE NO. | 12 | 13 | 14 | 15 | 16 | 17 | 18 | 19 | 20 |
|---|---|---|---|---|---|---|---|---|---|
| Weight | 45.3 | 45.5 | 45.5 | 45.5 | 45.4 | 45.5 | 45.2 | 45.5 | 45.4 |
| Compression | 51 | 50 | 50 | 49 | 53 | 52 | 51 | 53 | 54 |
| C.O.R. | .779 | .782 | .782 | .780 | .776 | .773 | .775 | .777 | .774 |
| Shore C Hardness | 83 | 86 | 86 | 86 | 81 | 84 | 84 | 81 | 78 |
| Cut Resistance | 4 | 4 | 4 | 4 | 4 | 4 | 4 | 4 | 4 |

TABLE 4

| EXAMPLE NO. | 21 | 22 | 23 | 24 | 25 | 26 | 27 | 28 | 29 | 30 | 31 | 32 | 33 |
|---|---|---|---|---|---|---|---|---|---|---|---|---|---|
| Weight | 45.3 | 45.3 | 45.1 | 45.2 | 45.3 | 45.2 | 45.9 | 45.5 | 45.6 | 45.6 | 45.2 | 46.0 | 46.0 |
| Compression | 51 | 53 | 56 | 55 | 53 | 58 | 60 | 57 | 57 | 57 | 57 | 59 | 56 |
| C.O.R. | .799 | .792 | .785 | .791 | .792 | .792 | .784 | .784 | .785 | .783 | .789 | .786 | .787 |
| Shore D Hardness | 69 | 65 | 62 | 65 | 66 | | | 53 | 45 | 55 | | | |
| Cut Resistance | 5 | 2 | 4 | 4 | 4 | 3–4 | 3–4 | 3–4 | 3 | 3 | 3–4 | 3–4 | 3–4 |
| Shore A Hardness | | | | | | 91 | 90 | | | | 91 | 94 | 85 |

TABLE 5

| | PRIOR ART GOLF BALLS | |
|---|---|---|
| EXAMPLE NO. | ORIGINAL TOUR EDITION 34 | TITLEIST 384 BALATA 35 |
| Weight | 45.1 | 45.4 |
| Compression | 63 | 68 |
| C.O.R. | .795 | .784 |
| Shore C Hardness | 76 | 79 |
| Cut Resistance | 3–4 | 1 |
| Driver Testing | | |
| Carry | 244.3 | 244.4 |
| Total | 262.4 | 262.9 |
| Timed Flight | 5.99 | 5.90 |
| Trajectory | 13.9 | 13.6 |
| 5-Iron | | |
| Launch Angle | 7.6 | 7.5 |
| Clubhead Speed | 232.4 | 235.5 |
| Spin Rate (RPM) | 2512 | 3090 |

TABLE 6

| | PRIOR ART GOLF BALLS | | | | | |
|---|---|---|---|---|---|---|
| EXAMPLE NO. | TITLEIST 384 BALATA 36 | MAXFLT DDH TOUR LTD BALATA 37 | SLAZENGER 480 INTER-LOCK BALATA 38 | DUNLOP JAPAN BLACK MISSILE 39 | TOP-FLITE 40 | ORIGINAL TOUR EDITION 41 |
| Weight | 45.4 | 45.2 | 45.4 | 45.2 | 45.1 | 45.3 |
| Compression | 64 | 61 | 56 | 49 | 52 | 61 |
| C.O.R. | .786 | .785 | .794 | .817 | .817 | .793 |
| Shore C. Hardness | 76 | 76 | 76 | 95 | 95 | 76 |
| Cut Resistance | 1 | 1 | 1 | 4–5 | 5 | 3–4 |
| Driver Testing: | | | | | | |
| Carry | 255.0 | 254.0 | 259.2 | 254.0 | 261.0 | |
| Total | 296.0 | 294.0 | 294.0 | 290.0 | 308.0 | |
| Trajectory | 13.1 | 14.0 | 13.9 | 13.3 | 14.2 | |
| Pitching Wedge: | | | | | | |
| Launch Angle | | 31.3 | | | 31.9 | 28.3 |
| Clubhead Speed | | 108.0 | | | 110.2 | 110.7 |
| Spin Rate (RPM) | | | 9259 | | 8374 | 10,499 |

DISCUSSION OF THE EXAMPLES

Examples 1-5, 8, 13-15 and 17-19, the data of which is incorporated in Tables 2 and 3, are golf ball cover compositions in accordance with this invention.

Examples 21-33, as per Table 4, are comparative examples wherein inferior golf ball cover compositions were created.

Examples 34-40, as per Tables 5 and 6, reflect prior art golf balls.

In order to properly correlate the distance data as is reflected in some of the examples, it should be noted that the data for Example 1 was taken at the same time as the data for Examples 36-40 as per Table 6.

Likewise, the distance data for Example 2 was taken at the same time as the data for Examples 34 and 35 as per Table 5.

Distance data was not available for all of the examples due to the difficulty in gathering this data. The data for Examples 1-5 and 8, as per Table 2, reflects the preferred cover composition in accordance with this invention, wherein relatively soft covered balls having superior coefficient of restitution and superior cut resistance are produced.

The balls of Examples 6 and 7 are too hard to offer sufficiently good playability. Conversely, the balls of Examples 9-11, while being soft, suffer from poor cut resistance and low coefficient of restitution.

When compared to the prior art golf ball, Examples 1-5 and 8 as per Table 5, it can be seen that the average coefficient of restitution for these examples is higher than the average coefficient of restitution for Examples 34 and 35. Further, it can be seen that the cut resistance is significantly better.

In comparing the actual distance that the resultant golf balls will fly, it can be seen that in comparing the data of Example 2 with the data for Examples 34 and 35, the golf ball of Example 2 is approximately 4 yards longer than that of the balls of Examples 34 and 35. This 4 yard increase is a significant increase which could be easily observed by a skilled golfer. Likewise, relative to the data for Example 2, it can be seen that it has a high spin rate of 2744 which is intermediate between the spin rates of 2512 and 3090 for the balls of Examples 34 and 35. The prior art golf balls of Examples 34 and 35 are known to have spin rates which are satisfactory to skilled golfers.

Further, when comparing the data of Example 1 with the data of Examples 36-39, which are similar soft golf balls, it can be seen that the ball of Example 1 is significantly longer than the balls of Examples 36-39. Further, the ball of Example 1 is significantly more durable than the balls of Examples 36-39, as per the cut resistance data. Further, the ball of Example 1 has a spin rate when struck by a pitching wedge that is comparable to that of Examples 37 and 41. Likewise, it can be seen that the spin rate of Example 1 is much higher than that of the balls of Example 40.

The data of Table 3, as per Examples 12-20, reflect the variations of the cover composition in accordance with this invention which is some instances do not have the coefficient of restitution which is as good as that of the data of Examples 1-5, 8, 13-15 and 17-19. However, the data of Table 3 demonstrates that over a wide range of variables, the cover composition of this invention is capable of producing a durable cut resistant golf ball.

The data of Table 4 reflects other relative cover compositions wherein a hard Surlyn is blended with, for example, polyurethanes. From this data, it can be seen that golf balls of Examples 21-33 are not as durable, at a comparable softness, as the preferred golf balls in accordance with this invention as per Examples 1-5 and 8.

The data for Examples 21-33 demonstrates that it is not obvious to produce a durable soft cover golf ball having excellent cut resistance, coupled with a good coefficient of restitution.

The data for Examples 27-33 shows that if a soft golf ball is produced, it has a poor coefficient of restitution and, hence, poor distance properties and poor cut resistance.

From the data as listed above and the above discussion, it can be seen that when the subject invention is practiced as per Examples 1-5 and 8, a golf ball having superior playability is produced, having excellent distance properties as are reflected by the coefficient data and excellent durability properties as is reflected by the cut resistance data.

What is claimed is:

1. A golf ball comprising a core and a cover, wherein said cover comprises from about 25 to about 75 percent of a hard ionomer which is a sodium or zinc salt of the copolymer of an olefin having from 2 to 8 carbon atoms and an unsaturated monocarboxylic acid having from 3 to 8 carbon atoms, wherein said hard ionomer has a modulus of from about 30,000 to about 50,000 P.S.I. and from about 75 to about 25 percent of a soft ionomer which is a sodium or zinc salt of a terpolymer of an olefin having from 2 to 8 carbon atoms, an unsaturated monocarboxylic acid having from 3 to 8 carbon atoms, and an unsaturated monomer of the acrylate ester class having from 2 to 22 carbon atoms, wherein said soft ionomer has a modulus of from about 3,000 to 7,000 P.S.I.

2. The golf ball of claim 1 wherein the hard ionomer is a sodium or zinc salt of the copolymer of ethylene and methacrylic acid and the soft ionomer is a sodium salt of a terpolymer of ethylene, methacrylic acid and n- or iso-butyl acrylate.

3. The golf ball of claim 2 wherein said cover comprises from about 35 to about 65 percent of the hard ionomer and from about 65 to about 35 percent of the soft ionomer.

4. The golf ball of claim 2 wherein said cover comprises about 38 to about 62 percent of the hard ionomer and from about 62 to about 38 percent of the soft ionomer.

5. The golf ball of claim 2 wherein said cover comprises about 36.8 percent of the hard ionomer and about 59.9 percent of the soft ionomer.

6. The golf ball of claim 2 wherein said cover comprises about 59.0 percent of the hard ionomer and about 38.7 percent of the soft ionomer.

7. The golf ball of claim 2 wherein said cover composition incorporates an effective amount of a suitable pigment.

8. The golf ball of claim 3 wherein said cover composition incorporates an effective amount of a suitable pigment.

9. The golf ball of claim 4 wherein said cover composition incorporates an effective amount of a suitable pigment.

10. The golf ball of claim 5 wherein said cover composition incorporates an effective amount of a suitable pigment.

11. The golf ball of claim 6 wherein said cover composition incorporates an effective amount of a suitable pigment.

12. The golf ball of claim 2 wherein said cover composition incorporates from about 1 to about 10 percent of a suitable pigment.

13. The golf ball of claim 3 wherein said cover composition incorporates from about 1 to about 10 percent of a suitable pigment.

14. The golf ball of claim 4 wherein said cover composition incorporates from about 1 to about 10 percent of a suitable pigment.

15. The golf ball of claim 5 wherein said cover composition incorporates from about 1 to about 10 percent of a suitable pigment.

16. The golf ball of claim 6 wherein said cover composition incorporates from about 1 to about 10 percent of a suitable pigment.

17. The golf ball of claim 2 wherein said cover composition incorporates from about 1 to about 5 percent of a pigment which is a member selected from the group of titanium dioxide, barium sulfate, zinc oxide or zinc sulfate.

18. The golf ball of claim 3 wherein said cover composition incorporates from about 1 to about 5 percent of a pigment which is a member selected from the group of titanium dioxide, barium sulfate, zinc oxide or zinc sulfate.

19. The golf ball of claim 4 wherein said cover composition incorporates from about 1 to about 5 percent of a pigment which is a member selected from the group of titanium dioxide, barium sulfate, zinc oxide or zinc sulfate.

20. The golf ball of claim 5 wherein said cover composition incorporates from about 1 to about 5 percent of a pigment which is a member selected from the group of titanium dioxide, barium sulfate, zinc oxide or zinc sulfate.

21. The golf ball of claim 7 wherein said cover composition incorporates from about 1 to about 5 percent of a pigment which is a member selected from the group of titanium dioxide, barium sulfate, zinc oxide or zinc sulfate.

22. The golf ball of claim 2 wherein said cover composition incorporates from about 1 to about 3 percent of a pigment which is a member selected from the group of titanium dioxide, barium sulfate, zinc oxide or zinc sulfate.

23. The golf ball of claim 3 wherein said cover composition incorporates from about 1 to about 3 percent of a pigment which is a member selected from the group of titanium dioxide, barium sulfate, zinc oxide or zinc sulfate.

24. The golf ball of claim 4 wherein said cover composition incorporates from about 1 to about 3 percent of a pigment which is a member selected from the group of titanium dioxide, barium sulfate, zinc oxide or zinc sulfate.

25. The golf ball of claim 5 wherein said cover composition incorporates from about 1 to about 3 percent of a pigment which is a member selected from the group of titanium dioxide, barium sulfate, zinc oxide or zinc sulfate.

26. The golf ball of claim 6 wherein said cover composition incorporates from about 1 to about 3 percent of a pigment which is a member selected from the group of titanium dioxide, barium sulfate, zinc oxide or zinc sulfate.

* * * * *

REEXAMINATION CERTIFICATE (1641st)

United States Patent [19]

Sullivan

[11] B1 4,884,814

[45] Certificate Issued  Feb. 18, 1992

[54] GOLF BALL

[75] Inventor: Michael J. Sullivan, Chicopee, Mass.

[73] Assignee: Spalding & Evenflo Companies, Inc.

Reexamination Request:
No. 90/002,017, May 9, 1990

Reexamination Certificate for:
Patent No.: 4,884,814
Issued: Dec. 5, 1989
Appl. No.: 144,200
Filed: Jan. 15, 1988

[51] Int. Cl.$^5$ .............. A63B 37/12; C08K 3/14; C08K 3/30; C08L 33/02
[52] U.S. Cl. .............. 273/235 R; 524/413; 524/423; 524/432; 524/908; 525/196; 525/221; 525/327.8; 525/330.2
[58] Field of Search .............. 273/235 R; 525/196, 525/221

[56] References Cited

U.S. PATENT DOCUMENTS

| | | | |
|---|---|---|---|
| 3,264,272 | 8/1966 | Rees | 428/36.9 |
| 4,679,795 | 7/1987 | Melvin | 273/235 R |
| 4,690,981 | 9/1987 | Statz | 525/329.6 |

FOREIGN PATENT DOCUMENTS 1213389  10/1986  Canada .

OTHER PUBLICATIONS

"Research Disclosure" magazine, Nov. 1986 issue, p. 642, article entitled Ionomer Blends for Golf Ball Covers.

*Primary Examiner*—Patricia Short

[57] ABSTRACT

The subject invention relates to golf ball technology, and more particularly, golf ball cover technology. The invention is concerned with a particular mixture of ionic resins as a golf ball cover composition.

Ionomers have been widely used as golf ball cover materials for the past 15 years. While these ionomers are very durable, they have a deficiency as a golf ball cover material in that they tend to be hard. This invention is concerned with a mixture of a hard ionomer with a soft ionomer in order to produce a golf ball cover composition wherein the cover is softer than the prior art ionomer covers.

A golf ball covered in accordance with this invention is durable and a skilled golfer can impart back spin to the ball in play.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 17, lines 17-27:

Distance data was not available for all of the examples due to the difficulty in gathering this data. The data for Examples [1-5 and 8,] *1-5, 8 and 9,* as per Table 2, reflects the preferred cover composition in accordance with this invention, wherein relatively soft covered balls having superior coefficient of restitution and superior cut resistance are produced.

The balls of Examples 6 and 7 are too hard to offer sufficiently good playability. Conversely, the balls of Examples [9-11,] *10 and 11,* while being soft, suffer from poor cut resistance and low coefficient of restitution.

Column 17, lines 60-68:

The data of Table 3, as per Examples 12-20, reflect the variations of the cover composition in accordance with this invention which [is] *in* some instances do not have the coefficient of restitution which is as good as that of the data of Examples 1-5, [8,] *8 and 9,* 13-15 and 17-19. However, the data of Table 3 demonstrates that over a wide range of variables, the cover composition of this invention is capable of producing a durable cut resistant golf ball.

Column 18, lines 16-22:

From the data as listed above and the above discussion, it can be seen that when the subject invention is practiced as per Examples 1-5, [and 8,] *8 and 9,* a golf ball having superior playability is produced, having excellent distance properties as are reflected by the coefficient data and excellent durability properties as is reflected by the cut resistance data.

AS A RESULT OF REEXAMINATION, IT HAS BEEN DETERMINED THAT:

Claims 7-11 having been finally determined to be unpatentable, are cancelled.

Claims 1 and 21 are determined to be patentable as amended.

Claims 2-7, 12-20 and 22-26, dependent on an amended claim, are determined to be patentable.

1. A golf ball comprising a core and a cover, wherein said cover comprises from about 25 to about [75] *70* percent of a hard ionomer which is a sodium or zinc salt of the copolymer of an olefin having from 2 to 8 carbon atoms and an unsaturated monocarboxylic acid having from 3 to 8 carbon atoms, wherein said hard ionomer has a modulus of from about 30,000 to 50,000 P.S.I. and from about 75 to about [25] *30* percent of a soft ionomer which is a sodium or zinc salt of a terpolymer of an olefin having from 2 to 8 carbon atoms, an unsaturated monocarboxylic acid having from 3 to 8 carbon atoms, and an unsaturated monomer of the acrylate ester class having from 2 to 22 carbon atoms, wherein said soft ionomer has a modulus of from about 3,000 to 7,000 P.S.I. *and an effective amount of a suitable pigment.*

21. The golf ball of claim [7] *6* wherein said cover composition incorporates from about 1 to about 5 percent of a pigment which is a member selected from the group of titanium dioxide, barium sulfate, zinc oxide or zinc sulfate.

* * * * *